US010330800B2

(12) United States Patent
Chaudhury et al.

(10) Patent No.: US 10,330,800 B2
(45) Date of Patent: Jun. 25, 2019

(54) X-RAY DETECTOR WITH A VOLTAGE SOURCE DEVICE FOR GENERATING A PULSED POTENTIAL DIFFERENCE

(71) Applicant: Siemens Healthcare GmbH, Erlangen (DE)

(72) Inventors: Shameem Kabir Chaudhury, Erlangen (DE); Alfons Eismann, Pinzberg (DE); Thorsten Ergler, Erlangen (DE); Thomas Hilderscheid, Altdorf (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 15/914,013

(22) Filed: Mar. 7, 2018

(65) Prior Publication Data
US 2018/0259658 A1    Sep. 13, 2018

(30) Foreign Application Priority Data
Mar. 10, 2017  (DE) ........................ 10 2017 204 027

(51) Int. Cl.
*G01T 1/24*    (2006.01)
(52) U.S. Cl.
CPC ................ *G01T 1/247* (2013.01); *G01T 1/24* (2013.01); *G01T 1/249* (2013.01)
(58) Field of Classification Search
CPC ................................. G01T 1/247; G01T 1/249
See application file for complete search history.

(56) References Cited

U.S. PATENT DOCUMENTS

| 6,075,256 A * | 6/2000 | Kaifu ................... G01T 1/2018 |
| | | 257/53 |
| 2009/0242780 A1* | 10/2009 | Seino ........................ G01T 1/24 |
| | | 250/370.09 |
| 2011/0204248 A1* | 8/2011 | Seino ........................ G01T 1/17 |
| | | 250/371 |

(Continued)

FOREIGN PATENT DOCUMENTS

| DE | 102012213410 B3 | 9/2013 |
| DE | 102013215714 A1 | 3/2015 |

(Continued)

OTHER PUBLICATIONS

German Office Action dated Oct. 17, 2017 for German Application No. 10 2017 204 027.0.

*Primary Examiner* — Marcus H Taningco
(74) *Attorney, Agent, or Firm* — Harness, Dickey & Pierce, P.L.C.

(57) ABSTRACT

An X-ray detector includes a direct-conversion converter element and an evaluating unit in a stacked arrangement. In an embodiment, the X-ray detector includes a voltage source, configured to provide a first potential and a second potential different from the first potential; a pulse generating unit for generating voltage pulses; and a connecting unit, for applying the voltage pulses onto the first potential, configured at the output to provide a pulsed potential. In an embodiment, through the application of the pulsed potential to a first surface of the direct-conversion converter element and through the application of the second potential to a second surface of the converter element opposed to the first surface, a pulsed potential difference is formed in the direct-conversion converter element.

26 Claims, 3 Drawing Sheets

(56) References Cited

U.S. PATENT DOCUMENTS

2015/0260856 A1    9/2015  Dierre et al.
2015/0301199 A1   10/2015  Nellissen et al.
2016/0220222 A1*   8/2016  Schroeter .................. G01T 1/00

FOREIGN PATENT DOCUMENTS

DE      102015201494 A1    8/2016
FR           2719127 A1   10/1995

* cited by examiner

FIG 1

X-RAY DETECTOR WITH A VOLTAGE SOURCE DEVICE FOR GENERATING A PULSED POTENTIAL DIFFERENCE

PRIORITY STATEMENT

The present application hereby claims priority under 35 U.S.C. § 119 to German patent application number DE 102017204027.0 filed Mar. 10, 2017, the entire contents of which are hereby incorporated herein by reference.

FIELD

At least one embodiment of the invention generally relates to an X-ray detector, a medical device and/or a method to this end, wherein a pulsed potential difference is formed in a direct-conversion converter element.

BACKGROUND

In X-ray imaging, for example, in computed tomography, angiography or radiography, counting direct-conversion X-ray detectors or integrating indirect-conversion X-ray detectors can be used.

The X-ray radiation or the photons can be converted in direct-conversion X-ray detectors into electric pulses by a suitable converter material. As a converter material, for example CdTe, CZT, CdZnTeSe, CdTeSe, CdMnTe, InP, TlBr$_2$, HgI$_2$, GaAs or other substances can be used. The incident X-ray radiation deposits energy in the converter material, whereby electron-hole pairs are formed. By the application of a potential difference, in particular a high voltage of approximately −1000 V, electrons and holes are caused to drift to the opposing electrodes. Electric pulses are passed on to the evaluating unit. The electric pulses are evaluated by an evaluating electronics system, for example, an integrated circuit (Application Specific Integrated Circuit, ASIC).

In counting X-ray detectors, incident X-ray radiation is measured by counting the electric pulses that are triggered by the absorption of X-ray photons in the converter material. The size of the electric pulse is typically proportional to the energy of the absorbed X-ray photon. By this, an item of spectral information can be extracted through the comparison of the size of the electric pulse with a threshold value.

From the document DE 10 2015 201 494 A1, there is known a method for determining the polarization state of a sensor of an X-ray detector, the X-ray detector being illuminated with a light pulse sequence. The individual pulses of the light pulse sequence have a different intensity. It is further determined at what intensity of the light pulses, charge pulses generated by the sensor of the X-ray detector exceed a pre-set threshold voltage of a signal detection circuit.

From the document DE 10 2012 213 410 B3, there is known a direct-converting X-ray detector for detecting X-ray radiation which comprises at least one semiconductor used for the detection of X-ray radiation and at least one electrode applied to the semiconductor. The semiconductor and the at least one electrode are electrically conductively connected, the at least one electrode being transparent and configured electrically conductive.

SUMMARY

The inventors have discovered that it is a problem that the production of an at least partially transparent electrode requires additional manufacturing steps and an even illumination of the direct-conversion converter element is associated with a great effort.

At least one embodiment of the invention provides for an X-ray detector, a medical device and a method which enable the determination of a state of the direct-conversion converter element without additional illumination, for example, by way of infrared, ultraviolet or visible light or without an at least partially transparent electrode.

At least one embodiment of the invention is directed to an X-ray detector, a medical device and/or a method.

At least one embodiment of the invention relates to an X-ray detector having a direct-conversion converter element and an evaluating unit in a stacked arrangement and a voltage source device. The voltage source device comprises a voltage source which is configured to provide a first potential and a second potential different from the first potential. The voltage source device further comprises a pulse generating unit for generating voltage pulses and a connecting unit for applying the voltage pulses onto the first potential, the connecting unit being configured at the output to provide a pulsed potential. Through the application of the pulsed potential to a first surface of the direct-conversion converter element and through the application of the second potential to a second surface of the converter element opposed to the first surface, a pulsed potential difference is formed in the direct-conversion converter element.

At least one embodiment of the invention also relates to a medical device comprising an inventive X-ray detector of at least one embodiment. The advantages of embodiments of the inventive X-ray detector can advantageously be transferred to the medical device. Advantageously, the costs can be reduced. Advantageously, the complexity of the X-ray detector is reduced.

According to one embodiment of the invention, the medical device is a computed tomography system. Advantageously, the reproducibility can be improved under the influence of a high photon flux of the radiation source.

At least one embodiment of the invention further relates to a method for determining a state of a direct-conversion converter element of an inventive X-ray detector, having the steps of applying, specifying and determining. In the step of applying, the pulsed potential is applied to a first surface of the direct-conversion converter element and the second potential is applied to a second surface of the converter element opposed to the first surface, so that a pulsed potential difference is formed in the direct-conversion converter element. In the step of specifying, an amplitude of the voltage pulses is specified at which charge pulses generated in the direct-conversion converter element of the X-ray detector exceed a pre-set threshold voltage in an evaluating unit. In the step of determining, the state of the direct-conversion converter element is determined based on the specified amplitude.

BRIEF DESCRIPTION OF THE DRAWINGS

Example embodiments of the invention will now be described in more detail, making reference to the drawings. In the drawings.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to an X-ray detector having a direct-conversion converter element and an evaluating unit in a stacked arrangement and a voltage source device. The voltage source device comprises a voltage source which is configured to provide a first potential and a second potential different from the first potential. The voltage source device further comprises a pulse generating unit for generating voltage pulses and a connecting unit for applying the voltage pulses onto the first potential, the connecting unit being configured at the output to provide a pulsed potential. Through the application of the pulsed potential to a first surface of the direct-conversion converter element and through the application of the second potential to a second surface of the converter element opposed to the first surface, a pulsed potential difference is formed in the direct-conversion converter element.

The X-ray detector, in at least one embodiment, can also be designated a counting X-ray detector. The direct-conversion converter element and the evaluating unit can be connected to one another, in particular, via a solder connection. The X-ray detector can have a plurality of detector elements, pixels and/or subpixels. The pulsed potential can be applied, in particular, to all the detector elements. The pulsed potential difference can preferably be formed substantially evenly in the direct-conversion converter element. The voltage pulses can be coupled into the detector elements. The direct-conversion converter element has a first surface and a second surface opposed to the first surface. The first surface can be, for example, facing away from the evaluating unit and, in particular, facing toward the radiation source. The second surface can be, for example, facing toward the evaluating unit.

The direct-conversion converter element can have contacts so that the pulsed potential and the second potential are applied to the direct-conversion converter element. The contacts can provide an electrically conducting connection between the direct-conversion converter element and the connecting unit or the voltage source. The voltage pulses or the pulsed potential generate charge pulses in the converter element so that counter results can be registered in the evaluating unit.

The first potential and/or the second potential can be, in particular, temporally constant. The first potential can be, for example, −1000 V. The second potential can be connected to ground. The pulsed potential can be designated potential with modulated voltage pulses. The pulsed potential difference can be designated a voltage with modulated-on voltage pulses. The voltage pulses can preferably only be applied to the first potential in calibration operation or servicing operation or outside of, in particular clinical, examination recordings. A plurality of voltage pulses can form a pulse sequence or a pulse train.

The voltage source can be a central power supply unit. The voltage source can be, in particular, a high voltage source. The pulse generating unit can comprise a pulse time generator, an amplitude modulator and a power amplifier. The pulse time generator and/or the amplitude modulator can be controlled via a control unit. The pulse time generator can have a settable pulse duration and a settable pulse spacing. The sampling ratio can be settable. The pulsed potential difference between the pulsed potential and the second potential can preferably be −900 to −1100 V. The amplitude of the voltage pulses can preferably be a maximum of 20 V, in particular 0 to 10 V.

Advantageously, an additional illumination with infrared, ultraviolet or visible light for determining a state of the direct-conversion converter element can be avoided. Advantageously, the illumination unit for additional illumination can be avoided. Advantageously, a non-transparent electrode which is less complex to manufacture can be used for applying the high voltage to the first surface of the converter element. Advantageously, the X-ray detector can be manufactured more economically. Advantageously, the pulsed potential can be applied substantially evenly to the direct-conversion converter element. Advantageously, the substantially evenly pulsed potential can be applied to a plurality of X-ray detectors of a detector module or to a plurality of detector devices, for example, in a medical device with two radiation source detector systems. The pulse generating unit can advantageously be provided centrally for a plurality of X-ray detectors.

According to one embodiment of the invention, a pulse length of the voltage pulses is between 1 ns and 900 ns, preferably between 50 ns and 200 ns. Advantageously, the charge pulses generated by the voltage pulses can have a substantially similar duration as the charge pulse that arises due to the absorption of X-ray radiation. Advantageously, the charge pulses can be applied at a high-frequency repetition rate onto the first potential. Advantageously, successive voltage pulses and charge pulses generated thereby can differ or be separated from one another.

According to one embodiment of the invention, a repetition rate of the voltage pulses is 100 kHz to 2 MHz. Advantageously, the state of the direct-conversion converter element can be determined within a suitable time window. Advantageously, the state of the direct-conversion converter element can be determined between clinical recordings, in particular to ensure a reproducibility of the recordings.

According to one embodiment of the invention, the X-ray detector also comprises a control unit for specifying an amplitude of the voltage pulses at which charge pulses generated in the direct-conversion converter element of the X-ray detector exceed a pre-set threshold voltage in an evaluating unit and/or for determining the state based on the specified amplitude. Via the control unit, the pulse length, the repetition rate and/or the amplitude of the voltage pulses can be controlled. Via the control unit, the method for determining the state of the direct-conversion converter element can be controlled. The control unit can be configured such that the pulsed potential is only generated if the X-ray detector is in an operating state for calibration or servicing. Advantageously, the control device can be included in the rotor of a computed tomography system so that the method needs no, or hardly any, communication with the stationary part of the computed tomography system.

At least one embodiment of the invention also relates to a medical device comprising an inventive X-ray detector of at least one embodiment. The advantages of embodiments of the inventive X-ray detector can advantageously be transferred to the medical device. Advantageously, the costs can be reduced. Advantageously, the complexity of the X-ray detector is reduced.

According to one embodiment of the invention, the medical device is a computed tomography system. Advantageously, the reproducibility can be improved under the influence of a high photon flux of the radiation source.

At least one embodiment of the invention further relates to a method for determining a state of a direct-conversion converter element of an inventive X-ray detector, having the steps of applying, specifying and determining. In the step of applying, the pulsed potential is applied to a first surface of the direct-conversion converter element and the second potential is applied to a second surface of the converter element opposed to the first surface, so that a pulsed potential difference is formed in the direct-conversion converter element. In the step of specifying, an amplitude of the voltage pulses is specified at which charge pulses generated in the direct-conversion converter element of the X-ray detector exceed a pre-set threshold voltage in an evaluating unit. In the step of determining, the state of the direct-conversion converter element is determined based on the specified amplitude.

In the specifying step, it can be specified in particular at what amplitude or what value of the amplitude the pre-set threshold voltage is exceeded in the evaluating unit. The state can be, in particular, a polarization state. The state can define, in particular, a degree of polarization of the direct-conversion converter element.

The method can be carried out as follows: the pulsed potential and the second potential are applied to the converter element. The pulsed potential can herein comprise a sequence of voltage pulses. The sequence of voltage pulses can, in particular, have voltage pulses with different amplitudes. The voltage pulses can generate charge pulses in the converter element. The charge pulses can be evaluated in the evaluating unit as a current pulse or, in particular, a voltage pulse.

In the evaluating unit, for example, a threshold value can be set in a discriminator. If a current pulse or a voltage pulse exceeds the threshold value, then a digital value, for example 1, can be output by the evaluating unit. If a current pulse or a voltage pulse does not exceed the threshold value, then another digital value, for example 0, can be output by the evaluating unit. The amplitude of a voltage pulse can be assigned to a digital value, for example 0 or 1. In the step of specifying, in particular the smallest amplitude at which the threshold is exceeded can be specified.

From the specified smallest amplitude, the state, in particular the polarization state of the converter element can be determined. Based on the determined state, a correction can be carried out. The correction can comprise a correction of the calibration parameters or the operating parameters. For example, for a plurality of states, calibration parameters in a calibration table or operating parameters in an operating parameter table can be callable. A selection can be made from the calibration table or the operating parameter table, based on the determined state of the calibration parameters or operating parameters. Thus, a correction can take place based upon the determined state. Advantageously, a substantially temporally constant signal response of the X-ray detector can be achieved.

The state of the direct-conversion converter element can be sensed by way of the voltage pulses or the pulsed potential difference. Thus, the stability of the state of the direct-conversion converter element can advantageously be tested.

Advantageously, the pulsed potential can be synchronously applied with pulse sequences to a plurality of X-ray detectors. Advantageously, the complexity of the read-out or processing can be reduced. Advantageously, the pulse sequences synchronously applied to a plurality of X-ray detectors can be identical, the pulse height and pulse shape, in particular, being identical. Advantageously, a substantially identical charge pulse can be generated in all the X-ray detectors. Advantageously, with X-ray detectors which need no coupling-in of infrared, ultraviolet or visible light, the state can be determined by way of the pulsed potential difference. Advantageously, a non-homogeneous generation of charge pulses in the direct-conversion converter element, for example, caused by charge effects of the illumination unit can be prevented.

According to one embodiment of the invention, the sequence of voltage pulses has a plurality of voltage pulses with substantially the same amplitudes. Advantageously, the state of the direct-conversion converter element can be determined more exactly.

According to one embodiment of the invention, the sequence of voltage pulses has amplitudes rising as a function of time or falling as a function of time. Advantageously, the state of the direct-conversion converter element can be sensed.

According to one embodiment of the invention, a correction of at least one operating parameter of the X-ray detector is carried out on the basis of the determined state or the specified amplitude. Advantageously, the reproducibility of recordings can be improved. The correction can be carried out in the correction step. The correction can comprise a correction of the calibration of the X-ray detector. The method can be carried out at regular intervals, for example, multiple times in a day between clinical recordings in order to enable the long-term stability of the polarization state of the X-ray detector. Advantageously, by way of the correction of the calibration, the number of new calibrations can be reduced.

According to one embodiment of the invention, the at least one operating parameter is a calibration parameter or an evaluation parameter. The calibration parameter can be stored, for example, in a calibration table. The calibration parameter can comprise a correction factor or an offset. The calibration parameter can comprise an evaluation parameter. The calibration table can assign a calibration parameter to an exceeded pre-set threshold voltage. The evaluation parameter can be a parameter of the evaluating unit, for example an amplification factor, an offset, an energy threshold or other. Advantageously, the operating parameter can be adapted to the state. Advantageously, the amendment of the state can be compensated for by the correcting of the operating parameter. The operating parameters can relate, for example, to the whole X-ray detector, individual detector elements or a group of detector elements.

According to one embodiment of the invention, no X-ray radiation is incident on the X-ray detector during the step of specifying. Advantageously, the X-ray detector or the medical device is in a calibration or servicing state. Advantageously, no clinical recording takes place at the same time.

Figure 1:
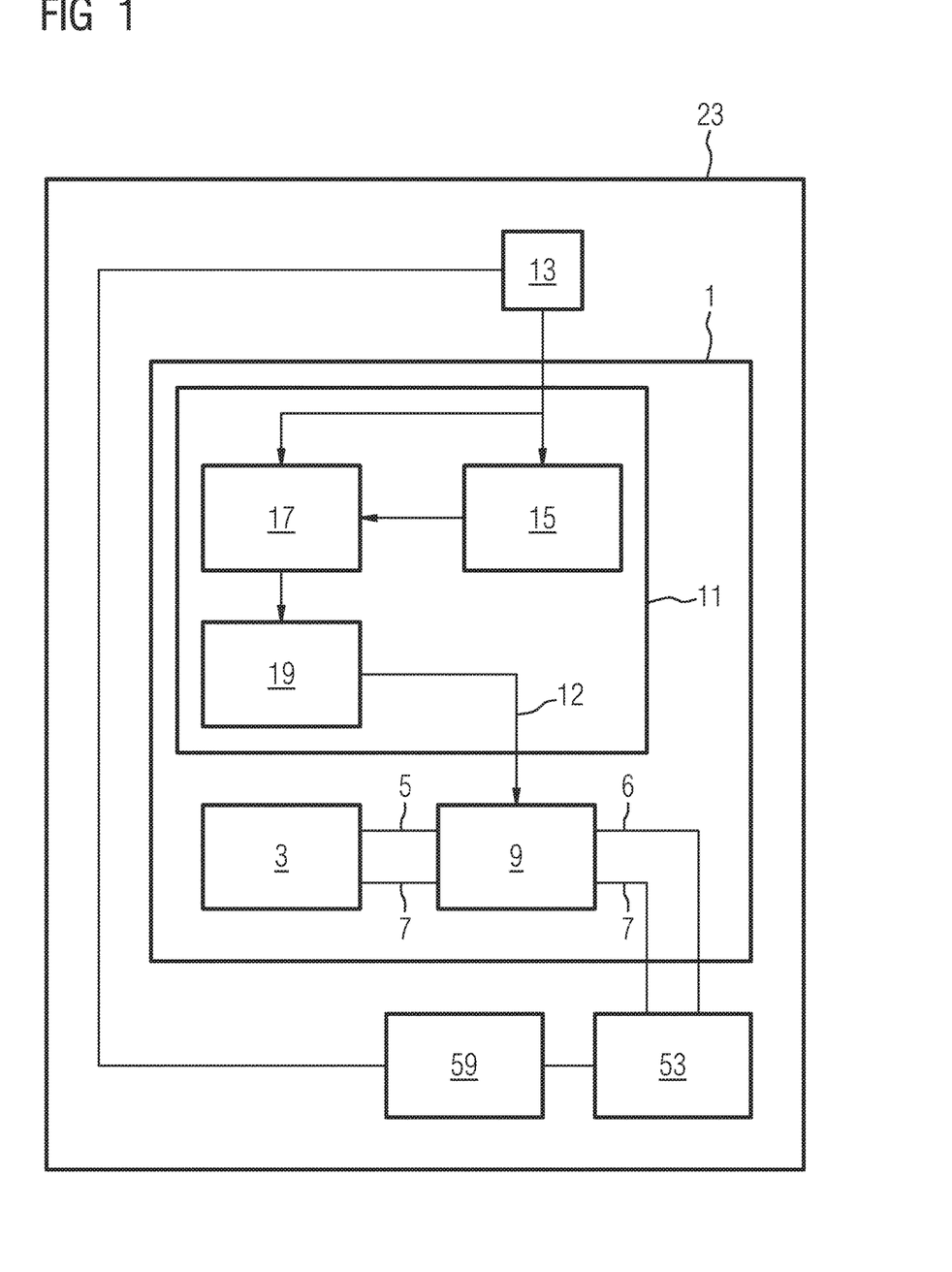
FIG. 1 shows a schematic representation of an inventive X-ray detector in a first embodiment.

FIG. 1 shows an example embodiment of the inventive X-ray detector 23 in a first embodiment. The X-ray detector 23 has a direct-conversion converter element 53 and an evaluating unit 59 in a stacked arrangement and a voltage source device 1. For a more transparent representation, the direct-conversion converter element 53 and the evaluating unit 59 are represented adjoining one another rather than in a stacked arrangement. The voltage source device 1 comprises a voltage source 3, a pulse generating unit 11 and a connecting unit 9. The voltage source 3 is configured to provide a first potential 5 and a second potential 7 different from the first potential 5. The pulse generating unit 11 includes a power generator and generates voltage pulses 12.

The pulse length of the voltage pulses 12 is between 1 ns and 900 ns. The repetition rate of the voltage pulses 12 is 100 kHz to 2 MHz. The connecting unit 9 applies the voltage pulses 12 onto the first potential 5 wherein the connecting unit 9 is configured at the output to provide a pulsed potential 6. Through the application of the pulsed potential 6 to a first surface of the direct-conversion converter element 53 and through the application of the second potential 7 to a second surface of the converter element 53 opposed to the first surface, a pulsed potential difference is formed in the direct-conversion converter element 53.

The X-ray detector 23 further comprises a control unit 13. The pulse time generator 15 and/or the amplitude modulator 17 can be controlled via the control unit 13. The control unit 13 can be configured for specifying an amplitude of the voltage pulses 12 at which charge pulses generated in the direct-conversion converter element 53 of the X-ray detector 23 exceed a pre-set threshold voltage in an evaluating unit 59 and/or for determining the state based on the specified amplitude. For this, a connection between the evaluating unit 59 and the control unit 13 can be provided.

Figure 2:
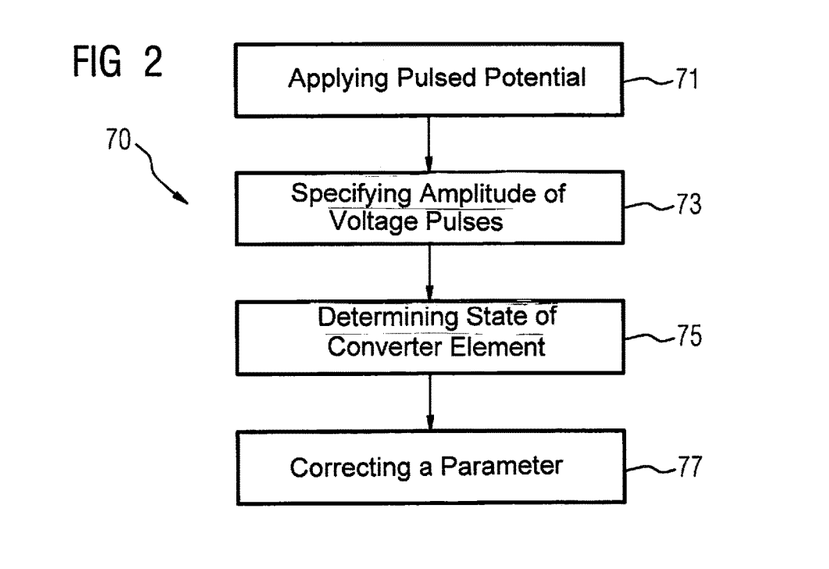
FIG. 2 shows a schematic representation of the inventive method of an embodiment.

FIG. 2 shows an example representation of an embodiment of the inventive method 70 for determining a state of a direct-conversion converter element of an X-ray detector. The method 70 has the steps of applying 71, specifying 73 and determining 75. The method 70 can further comprise the step of correcting 77.

The step of applying 71 comprises the application of the pulsed potential to a first surface of the direct-conversion converter element and the application of the second potential to a second surface of the converter element opposed to the first surface, so that a pulsed potential difference is formed in the direct-conversion converter element. The pulsed potential difference comprises a sequence or pulse sequence of voltage pulses. The state of the direct-conversion converter element is sensed by way of the voltage pulses or the pulsed potential difference. The pulsed potential can be synchronously applied with pulse sequences to a plurality of X-ray detectors. The pulse sequences synchronously applied at a plurality of X-ray detectors are identical, the pulse height and pulse shape, in particular, being identical. A substantially identical charge pulse can be generated in all the X-ray detectors or detector elements. The sequence of voltage pulses has a plurality of voltage pulses with substantially the same amplitudes and/or amplitudes rising as a function of time or falling as a function of time.

In the step of specifying 73, an amplitude of the voltage pulses is specified at which charge pulses generated in the direct-conversion converter element of the X-ray detector exceed a pre-set threshold voltage in an evaluating unit. In the step of specifying 73, it is specified at what amplitude or what value of the amplitude the pre-set threshold voltage is exceeded in the evaluating unit. During the step of applying 71 and the step of specifying 73, no X-ray radiation is incident on the X-ray detector. The X-ray detector or the medical device is in a calibration or servicing state.

In the step of determining 75, the state of the direct-conversion converter element is determined based on the specified amplitude. The state is, in particular, a polarization state. The state can define, in particular, a degree of polarization of the direct-conversion converter element.

In the step of correcting 77, a correction of at least one operating parameter of the X-ray detector is carried out on the basis of the determined state or the specified amplitude. The at least one operating parameter is a calibration parameter or an evaluation parameter. The calibration parameter can be stored, for example, in a calibration table. The calibration table can assign a calibration parameter to an exceeded pre-set threshold voltage. The evaluation parameter can be a parameter of the evaluating unit, for example an amplification factor, an offset, an energy threshold or other. The operating parameter can be adapted to the state. The amendment of the state can be compensated for by the correcting 77 of the operating parameter. The operating parameters can relate, for example, to the whole X-ray detector, individual detector elements or a group of detector elements.

Figure 3:
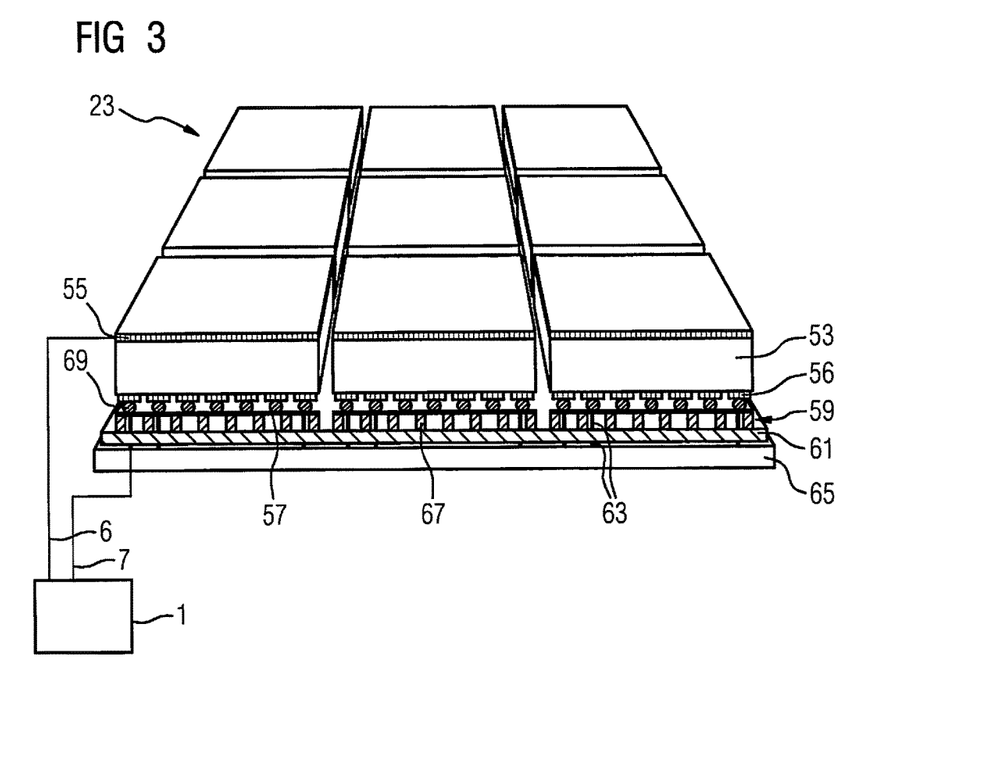
FIG. 3 shows a schematic representation of an inventive X-ray detector in a second embodiment.

FIG. 3 shows an example embodiment of the inventive X-ray detector 23 in a second embodiment with an arrangement of a plurality of direct-conversion converter elements 53 and evaluating units 59 in a stacked arrangement. In each case, one direct-conversion converter element 53 and one evaluating unit 59 are provided in a stacked arrangement. In a preferred embodiment, the X-ray detector 23 has a two-dimensional matrix or arrangement of a plurality of pixels or subpixels. The number of subpixels can lie, for example, in the range from 100 to several thousands. The subpixels can comprise a plurality of energy channels. The direct-conversion converter element 53 can be configured as an extensive direct converter comprising, for example, CdTe, CZT, CdZnTeSe, CdTeSe, CdMnTe, InP, TlBr$_2$, HgI$_2$, GaAs or other substances as the converter material.

The first surface of the direct-conversion converter element 53 has a top electrode 55. The second surface of the direct-conversion converter element 53 has a two-dimensional arrangement of contacts 56 or electrodes. The contacts 56 are connected via solder joints 69 to the pixel electrodes 57 and the pixel electronics 67 in the evaluating unit 59. The individual pixel electrodes 57 can, in particular, be separated from one another (not shown). The solder joints 69 can be configured, by way of example, as solder balls (bump bonds) or solder material in conjunction with copper pillars.

The number of contacts 56, the number of solder joints 69, the number of pixel electrodes 57 and the number of pixel electrodes 67 in the evaluating unit 59 are identical. The electric field between the top electrode 55 and a contact 56 determines a sensitive detection volume. The unit made of a detection volume, a contact 56, a solder joint 69, a pixel electrode 57 and a pixel electronics unit 67 connected to the pixel electrode 57 forms a pixel or a subpixel. The evaluating unit 59 is connected on the underside to a substrate 61.

The evaluating unit 59 is connected via TSV connections 63 through the substrate 61 to a peripheral electronics unit 65. The voltage source device 1 is connected to the top electrode 55 and the contacts 56. For clearer representation, only one connection to a contact 56 is shown. The pulsed potential 6 is applied to the top electrode 55. The second potential 7 is applied via the TSV connection 63 through the substrate 61 and the evaluating unit 59 and via the pixel electrodes 57 and the solder joints 69 to the contacts 56. The X-ray detector 23 can also comprise the control unit (not shown).

Figure 4:
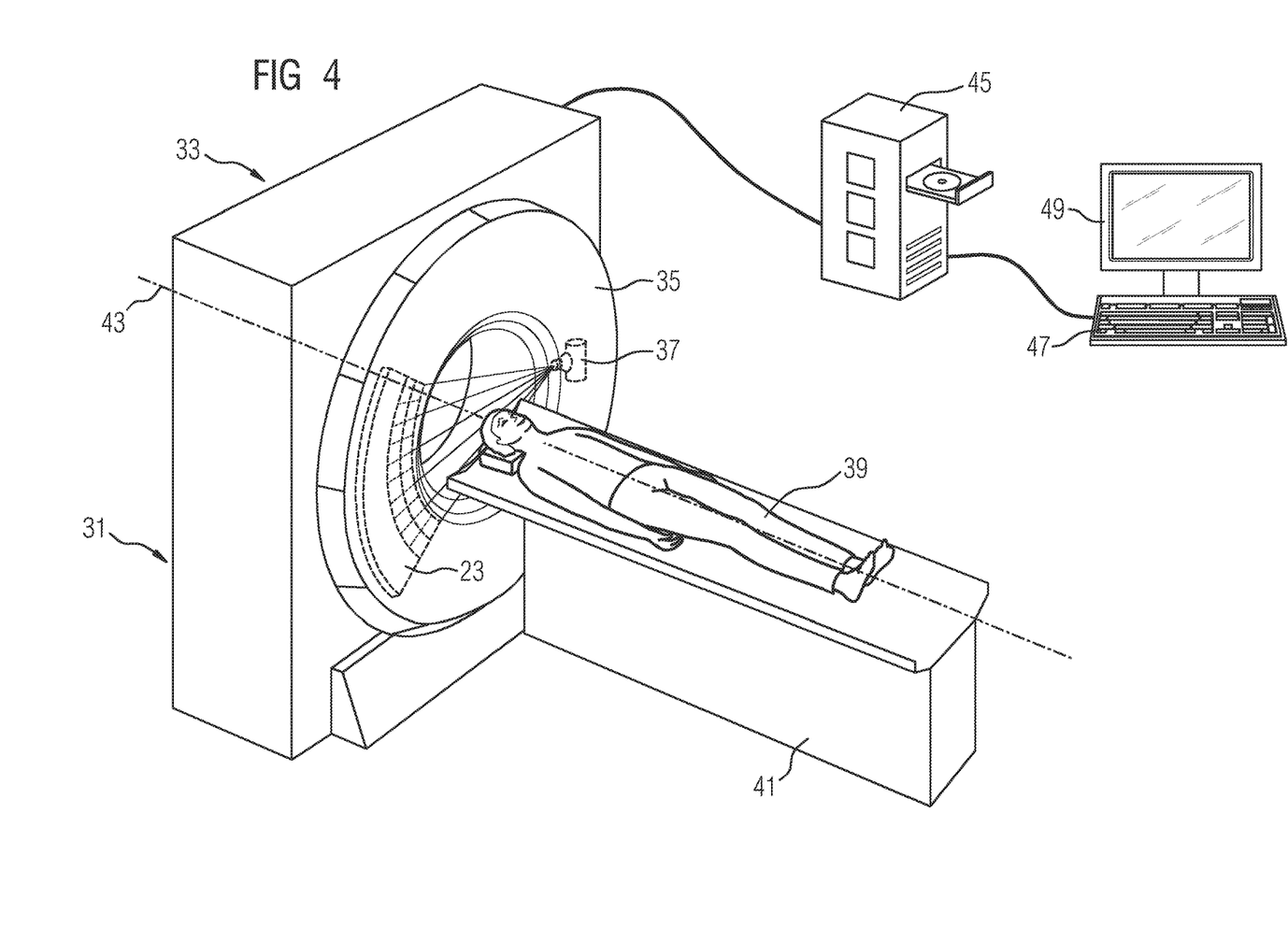
FIG. 4 shows a schematic representation of an inventive computed tomography system of an embodiment.

FIG. 4 shows an example embodiment of an inventive computed tomography system 31 with an inventive X-ray detector 23. The computed tomography system 31 contains a gantry 33 with a rotor 35. The rotor 35 comprises an X-ray source 37 and the inventive X-ray detector 23. The patient 39 is positioned on the patient support 41 and is movable along the rotation axis z 43 through the gantry 33. For control and computation of the slice images, a computer unit 45 is used. An input device 47 and an output device 49 are connected to the computer unit 45.

Although the invention has been illustrated in detail with the preferred example embodiment, the invention is not restricted by the examples given and other variations can be derived therefrom by a person skilled in the art without departing from the protective scope of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An X-ray detector including a direct-conversion converter element and an evaluating unit in a stacked arrangement, the X-ray detector comprising:
   a voltage source, configured to provide a first potential and a second potential, different from the first potential;
   a pulse generating unit to generate voltage pulses; and
   a connecting unit to apply the voltage pulses to the first potential, the connecting unit being configured at an output to provide a pulsed potential, wherein upon application of the pulsed potential to a first surface of the direct-conversion converter element and through application of the second potential to a second surface of the direct-conversion converter element, the second surface being opposed to the first surface, a pulsed potential difference is formed in the direct-conversion converter element.

2. The X-ray detector of claim 1, wherein a pulse length of the voltage pulses is between 1 ns and 900 ns.

3. The X-ray detector of claim 2, wherein a repetition rate of the voltage pulses is 100 kHz to 2 MHz.

4. The X-ray detector of claim 2, further comprising:
   a control unit to at least one of
      specify an amplitude of the voltage pulses at which charge pulses generated in the direct-conversion converter element of the X-ray detector exceed a threshold voltage in an evaluating unit of the X-ray detector and
      determine a state of the voltage pulses based on the amplitude specified.

5. A medical device comprising the X-ray detector of claim 2.

6. The medical device of claim 5, wherein the medical device is a computed tomography system.

7. The X-ray detector of claim 1, wherein a repetition rate of the voltage pulses is 100 kHz to 2 MHz.

8. The X-ray detector of claim 7, further comprising:
a control unit to at least one of
specify an amplitude of the voltage pulses at which charge pulses generated in the direct-conversion converter element of the X-ray detector exceed a threshold voltage in an evaluating unit of the X-ray detector and
determine a state of the voltage pulses based on the amplitude specified.

9. A medical device comprising the X-ray detector of claim 7.

10. The medical device of claim 9, wherein the medical device is a computed tomography system.

11. The X-ray detector of claim 1, further comprising:
a control unit to at least one of
specify an amplitude of the voltage pulses at which charge pulses generated in the direct-conversion converter element of the X-ray detector exceed a threshold voltage in an evaluating unit of the X-ray detector without illumination of the direct-conversion converter element, and
determine a state of the direct-conversion converter element based on the amplitude specified.

12. A medical device comprising the X-ray detector of claim 1.

13. The medical device of claim 12, wherein the medical device is a computed tomography system.

14. The X-ray detector of claim 1, further comprising a voltage source unit housing the voltage source, the pulse generating unit and connecting unit.

15. A method for determining a state of a direct-conversion converter element of an X-ray detector, comprising:
applying a pulsed potential to a first surface of the direct-conversion converter element and applying a second potential to a second surface of the direct-conversion converter element, the second surface being opposed to the first surface, so that a pulsed potential difference is formed in the direct-conversion converter element;
specifying an amplitude of voltage pulses at which charge pulses generated in the direct-conversion converter element of the X-ray detector exceed a threshold voltage in an evaluating unit of the X-ray detector without illumination of the direct-conversion converter element; and
determining the state of the direct-conversion converter element of an X-ray detector, based on the amplitude specified.

16. The method of claim 15, wherein a sequence of voltage pulses includes a plurality of voltage pulses with substantially equal amplitudes.

17. The method of claim 16, further comprising:
correcting at least one operating parameter of the X-ray detector, based upon the state determined or the amplitude specified.

18. The method of claim 17, wherein the at least one operating parameter is a calibration parameter or an evaluation parameter.

19. The method of claim 16, wherein, during the specifying, no X-ray radiation is incident on the X-ray detector.

20. The method of claim 15, wherein a sequence of voltage pulses includes amplitudes rising as a function of time or falling as a function of time.

21. The method of claim 20, further comprising:
correcting at least one operating parameter of the X-ray detector, based upon the state determined or the amplitude specified.

22. The method of claim 21, wherein the at least one operating parameter is a calibration parameter or an evaluation parameter.

23. The method of claim 20, wherein, during the specifying, no X-ray radiation is incident on the X-ray detector.

24. The method of claim 15, further comprising:
correcting at least one operating parameter of the X-ray detector, based upon the state determined or the amplitude specified.

25. The method of claim 24, wherein the at least one operating parameter is a calibration parameter or an evaluation parameter.

26. The method of claim 15, wherein, during the specifying, no X-ray radiation is incident on the X-ray detector.

* * * * *